(12) United States Patent
Miyata et al.

(10) Patent No.: US 7,358,500 B2
(45) Date of Patent: Apr. 15, 2008

(54) RADIATION DETECTION BY DUAL-FACED SCINTILLATION

(75) Inventors: Emi Miyata, Toyonaka (JP); Kazuhisa Miyaguchi, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 0 days.

(21) Appl. No.: 11/305,323

(22) Filed: Dec. 19, 2005

(65) Prior Publication Data

US 2006/0145083 A1 Jul. 6, 2006

(30) Foreign Application Priority Data

Dec. 20, 2004 (JP) ............................ P2004-368310

(51) Int. Cl.
*G01T 1/20* (2006.01)
(52) U.S. Cl. ............ 250/366; 250/370.11; 250/370.09; 378/114; 378/51
(58) Field of Classification Search .................... None
See application file for complete search history.

(56) References Cited

U.S. PATENT DOCUMENTS

| 4,823,016 | A | * | 4/1989 | Yamashita et al. | ..... 250/363.03 |
| 5,548,123 | A | * | 8/1996 | Perez-Mendez et al. | ..... 250/370.11 |
| 6,445,765 | B1 | * | 9/2002 | Frank et al. | ................... 378/56 |
| 7,049,600 | B2 | * | 5/2006 | Levin | ..................... 250/363.04 |
| 7,081,627 | B2 | * | 7/2006 | Heismann et al. | ..... 250/370.11 |
| 2005/0056790 | A1 | * | 3/2005 | Spahn | .................... 250/370.11 |

FOREIGN PATENT DOCUMENTS

| JP | 5-60868 | 3/1993 |
| JP | 2001-74845 | 3/2001 |
| WO | WO 99/66345 | 12/1999 |

OTHER PUBLICATIONS

Feather, N. et al, A Further Study of the Problem of Nuclear Isomerism: The Application of the Method of Coincidence Counting to the Investigation of the Gamma Rays Emiited by Uranium Z and the Radioactive Silver Ag 160; Proceedings of the Royal Society of London. Series A, Mathematical and Physical Sciences, vol. 168, No. 935, pp. 566-585, 1938.*
"Charged-Coupled Device" McGraw-Hill Encyclopedia of Science and Technology. The McGraw Hill Companies, Inc., 2005. Answers.com Mar. 22, 2007.*
Lawrence Berkeley National Lab HiRho CCD Group, http://design.lbl.gov/ccd/2.html, Sep. 25, 2004.*

* cited by examiner

*Primary Examiner*—David Porta
*Assistant Examiner*—Yara B Green
(74) *Attorney, Agent, or Firm*—Drinker Biddle & Reath LLP

(57) ABSTRACT

An imaging device comprising a scintillator and a first and second imaging elements. The scintillator emits scintillation light in response to an incident of an energy beam. The imaging elements take an image of the scintillation light. These imaging elements have imaging faces opposing to each other, and the scintillator is disposed between these imaging faces so that the scintillator overlaps with these imaging faces.

11 Claims, 7 Drawing Sheets

RADIATION DETECTION BY DUAL-FACED SCINTILLATION

BACKGROUND OF THE INVENTION

1. Field of the Invention

The present invention relates to an imaging device that takes an image of an energy beam such as an X-ray and to an imaging system including this imaging device.

2. Related Background Art

An imaging device using a charge coupled device ("CCD" hereinbelow) is one having superior energy resolution and position resolution. The CCD has superior detection efficiency to energy beams with a relatively low energy band (0.1 to 20 keV) known as soft X-rays and to visible light. However, the detection efficiency with respect to energy beams with a relatively high energy band (20 to 100 keV) known as hard X-rays is extremely low because silicon is used as a constituent material of the imaging device. As a result, when images of hard X-rays are taken by a CCD, a scintillator or the like must be used to convert the hard X-rays to scintillation light (visible light, for example) with an energy band that permits imaging by the CCD.

Japanese Patent Application Laid Open No. 2001-74845 discloses a technology for taking images of X-rays in a wide energy band. The imaging system (semiconductor device and radioactive beam imaging system) disclosed in this publication includes a CCD for imaging soft X-rays and a CsI scintillator for imaging hard X-rays.

SUMMARY OF THE INVENTION

In the radioactive beam imaging system disclosed in the above publication, the imaging face of the CCD is attached to a face of the CsI scintillator by an optical adhesive, and a metal film of aluminum or the like for reflection is attached to the opposite face of the scintillator on the side away from the CCD imaging face. When hard X-rays enter the CsI scintillator, scintillation light is radiated in all directions (isotropically). Some of the scintillation light which is radiated away from the CCD imaging face is reflected by the metal film and collected on the imaging face. Consequently, the scintillation light reflected by the metal film is incident on the imaging face of the CCD with the area of incidence being widened in comparison with the scintillation light that enters directly from the scintillator, thereby decreasing the resolution.

An object of the present invention is to provide an imaging device capable of taking an image of scintillation light generated in a scintillator at a high resolution and an imaging system that employs this imaging device.

In one aspect, the invention relates to an imaging device comprising: a scintillator for emitting scintillation light in response to an incident of an energy beam; and a first and second imaging elements for taking an image of the scintillation light. The first imaging element has a first imaging face, and the second imaging element has a second imaging face opposing to the first imaging face. The scintillator is disposed between the first and second imaging faces so that the scintillator overlaps with the first and second imaging faces.

The scintillator may be shaped in a plate having two opposing faces. One of the opposing faces overlaps with the first imaging face, and the other overlaps with the second imaging face.

The first imaging element may have a first region covered by the first imaging face and a second region adjacent to the first region. The first region may be thinner than the second region.

The second imaging element may have a third region covered by the second imaging face and a fourth region adjacent to the third region. The third region may be thinner than the fourth region.

The imaging device may further comprise a third imaging element for taking an image of an energy beam incident thereon. The third imaging element may have a third imaging face that overlaps with the first and second imaging faces.

The third imaging element may have a fifth region covered by the third imaging face and a sixth region adjacent to the fifth region. The fifth region may be thinner than the sixth region.

The scintillator may contain one or more of CsI, $Bi_4Ge_3O_{12}$ and $Gd_2O_2S$.

In another aspect, the invention relates to an imaging system comprising: the imaging device mentioned above; a sensor for detecting that the first and second imaging elements in the imaging device have taken images of the scintillation light at the same timing; and an image processor for combining the images taken by the first and second imaging elements into an output image signal when the sensor detects that the first and second imaging elements have taken images of the scintillation light at the same timing. "The same timing" in this specification does not only mean completely the same timing but also means timings with a sufficiently small interval such as one determined by a timing gate.

The sensor may detect that the first and second imaging elements emit image signals at the same timing, each of which has a level not less than a predetermined reference level.

BRIEF DESCRIPTION OF THE DRAWINGS

The present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
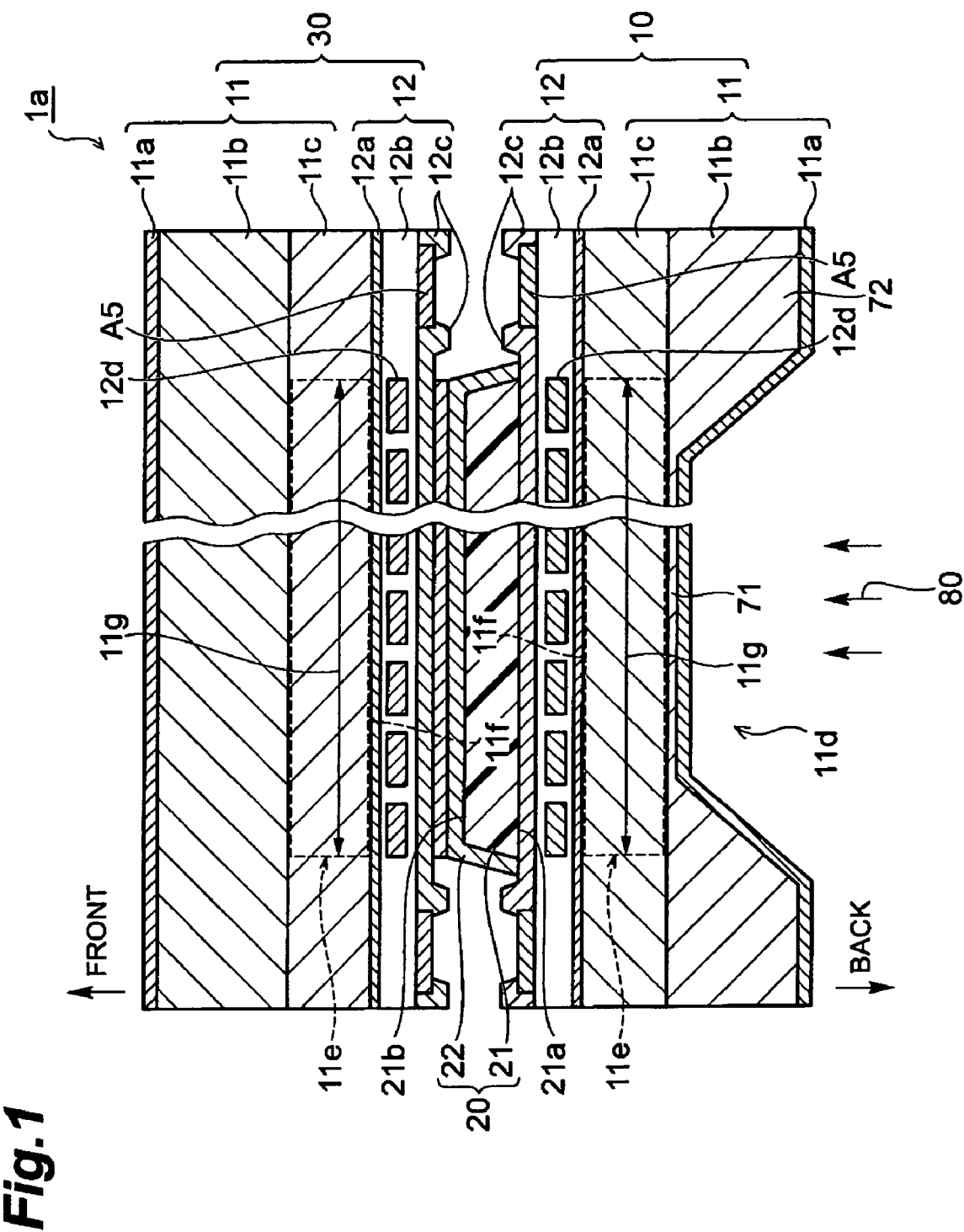
FIG. 1 is a cross sectional view showing an imaging device according to the embodiment.

The preferred embodiments of the present invention will be described below in greater detail with reference to the accompanying drawings. To facilitate understanding, identical reference numerals are used, where possible, to designate identical or equivalent elements that are common to the embodiments, and, in subsequent embodiments, these elements will not be further explained.

FIG. 1 is a cross sectional view showing an imaging device according to this embodiment. Hereinafter, the side (the lower side of FIG. 1) is called "the back side," where an energy beam to be imaged such as an X-ray enters, and the opposite side (the upper side of FIG. 1) is called "the front side."

As shown in FIG. 1, the imaging device 1 of this embodiment has a first CCD 10, a scintillator device 20, and a second CCD 30.

First, the configuration of the first CCD 10 will be described. The first CCD 10 is a full-frame transfer (FFT)-type CCD. The first CCD 10 has a semiconductor substrate 11 and a signal extraction region 12 which are stacked from the back side toward the front side. The semiconductor substrate 11 serves to photoelectrically convert an incident energy beam 80 into charge, and is configured of an insulating layer 11a, a $p^+$-type semiconductor layer 11b and a p-type epitaxial layer 11c which are stacked sequentially from the back side toward the front side.

The insulating layer 11a is a silicon oxide film or a silicon nitride film, or a composite film of these films. The thickness of the insulating layer 11a is on the order of 0.1 µm. The $p^+$-type semiconductor layer 11b is configured of a silicon substrate doped with a high concentration of boron, and has a thickness on the order of 300 µm. The $p^+$-type semiconductor layer 11b, which is on the back side of the semiconductor substrate 11, has a region 71 covered by an imaging portion 11e (described later) when viewed in a planar perspective, and a recess 11d is formed in this region 71, thereby partially tinning the layer 11b in the thickness direction. Therefore, the region 71 is thinner than a region 72 of the layer 11b adjacent to the region 71. The recess 11d has a depth substantially the same as the thickness of the $p^+$-type semiconductor layer 11b. A region thinned by the recess 11d of the $p^+$-type semiconductor layer 11b has a thickness on the order of 1 µm, and acts as an accumulation layer. Thus the recess 11d is formed on the back side of the semiconductor substrate 11 (that is, formed in the $p^+$-type semiconductor layer 11b) to thin the substrate 11, the amount of energy attenuation of the incident energy beam 80 is reduced.

The p-type epitaxial layer 11c is stacked on the front side of the $p^+$-type semiconductor layer 11b. The p-type epitaxial layer 11c has a high resistance on the order of a few kΩcm, and has a thickness on the order of 50 to 100 µm. When an energy beam with an energy from that of a soft X-ray to that of a visible light ray enters the depleted p-type epitaxial layer 11c, the energy beam is photoelectrically converted, within the p-type epitaxial layer 11c, and an amount of charge, which is proportional to the energy of the beam, is generated.

In the p-type epitaxial layer 11c, an imaging portion 11e is formed. The CCD channel 11g is also shown in FIG. 1. The imaging portion 11e is located in a position corresponding to those of transfer electrodes 12d (described later) when viewed in a planar perspective (in other words, the transfer electrodes 12d are contained in a region covered by the imaging portion 11e when viewed in a planar perspective). In the imaging portion 11e, potential wells are formed, or the shape or the position of the potential wells changes, corresponding to the voltage applied to the transfer electrodes 12d. Thus, by controlling the potential wells in the imaging portion 11e via the transfer electrode 12d, the charge generated by the imaging portion 11e can be accumulated in the potential wells, or can be transferred (moved) between the potential wells. The front side of the imaging portion 11e is hereafter named as an imaging face 11f. The front side means the side near the transfer electrodes 12d.

The signal extraction portion 12 serves to extract an image signal from the charge generated in the imaging portion 11e, and is configured of insulating layers 12a, 12b, and 12c stacked sequentially from the back side toward the front side. The insulating layer 12a is a silicon oxide film or a silicon nitride film, or a composite film of these films, and has a thickness on the order of 0.1 µm. The insulating layer 12b is a silicon oxide film or a silicon nitride film, or a composite film of these films. A plurality of transfer electrodes 12d made of polysilicon are provided in the insulating layer 12b. In particular, the imaging portion 11 in the p-type epitaxial layer 11c controls the potential wells according to the voltage applied to the transfer electrodes 12d. An insulating layer 12c is a silicon oxide film or a silicon nitride film, or a composite film of these films, and has a thickness on the order of 0.1 µm.

Figure 2:
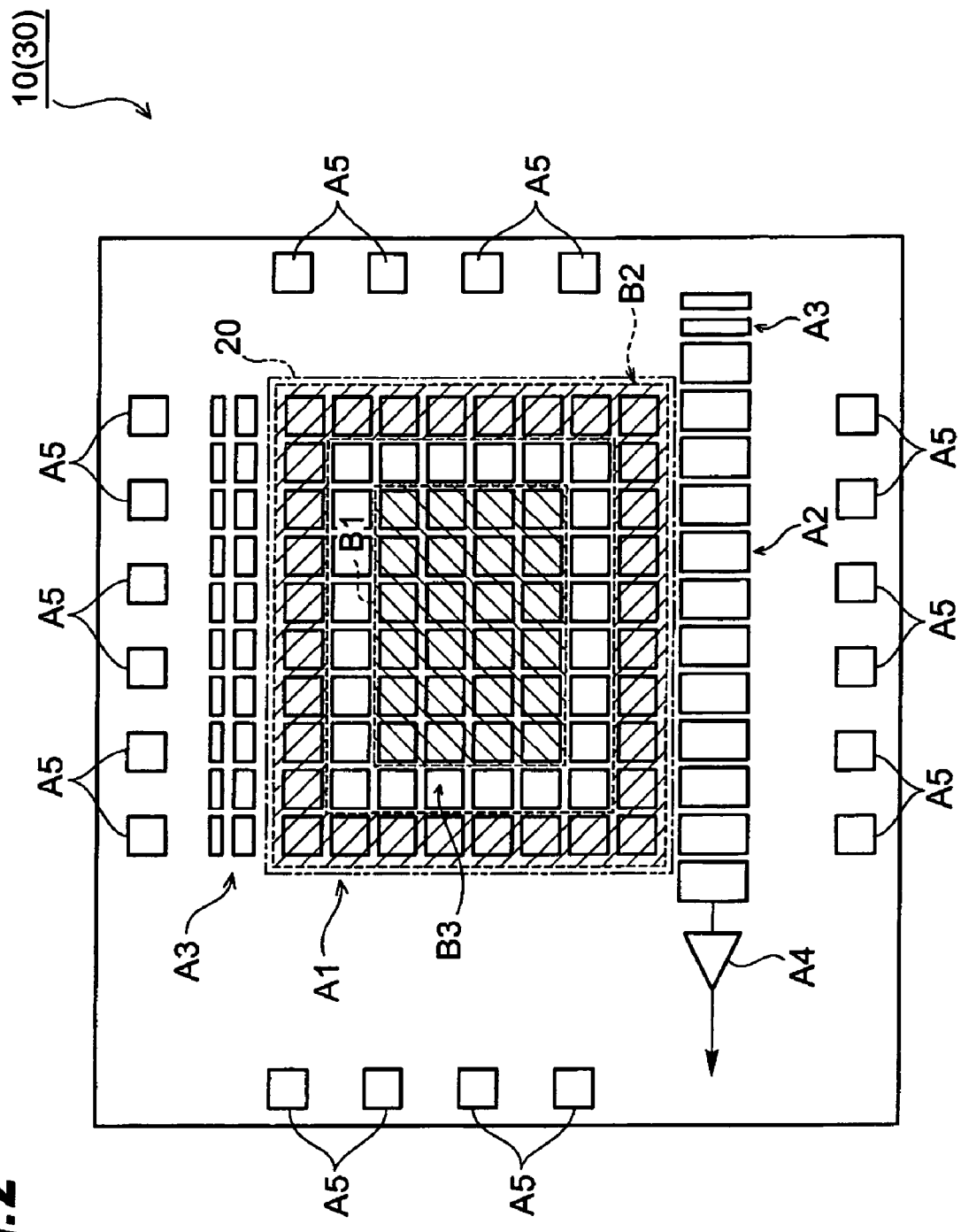
FIG. 2 is a schematic plan view showing the CCD of the imaging device of the embodiment.

The configuration of the first CCD 10 will now be described in detail with reference to FIG. 2. FIG. 2 is a schematic plan view showing the imaging device according to this embodiment In the insulating layer 12b, a vertical shift register A1, a horizontal shift register A2, input portions A3, and an output portion A4 are provided. Furthermore, a plurality of pad electrodes A5 are provided on the front face of the insulating layer 12b. The vertical shift register A1, horizontal shift register A2, input portion A3, and output portion A4 are electrically connected to their respective pad electrodes A5 via wiring (not shown).

The vertical shift register A1 has a plurality of transfer electrodes 12d arranged in a two-dimensional matrix shape, and the horizontal shift register A2 has a plurality of transfer electrodes 12d arranged in one dimension. Various potential wells are formed in the imaging portion 11e of the p-type epitaxial layer 11c by the vertical shift register A1 and the horizontal shift register A2.

As shown in FIG. 2, these various potential wells form an imaging area B1, an optical black area B2 and an isolation area B3 in the imaging portion 11e. The imaging area B1 is an area where charge is produced in response to incidence of an energy beam. The optical black area B2 is an area where energy beams do not enter, and is formed to surround the imaging area B1. The isolation area B3 is disposed between the imaging area B1 and the optical black area B2, and electrically separates the imaging area B1 from the optical black area B2. The optical black area B2 and the isolation area B3 can be used as references or the like for dark current, but are not necessarily required in the present embodiment.

The input portions A3 supply the vertical shift register A1 and the horizontal shift register A2 with signal charge as bias charge for reducing deterioration of the charge transfer efficiency of the CCD due to radiation rays. The signal charge is input from the outside via the pad electrodes A5. The charge accumulated in the potential wells in the imaging portion 11e is gradually transferred to the output portion A4 by controlling the potential wells. The output portion A4 extracts the charge transferred in this manner, converts the extracted charge into a voltage, amplifies this voltage, and outputs the amplified voltage to the outside via the pad electrode A5 as an image signal. The pad electrode A5 supplies various electrical signals such as a clock signal from the outside to the vertical shift register A1, horizontal shift register A2, input portions A3 or the like, and also extracts the charge from the imaging portion 11e. If bonding wire (not shown) is attached to the pad electrodes A5, the pad electrodes A5 can be electrically connected to an external board or the like via the bonding wire.

Referring to FIG. 1 again, the scintillator device 20 will now be described. The scintillator device 20 is a CsI scintillator, and covers the imaging portion 11e of the first CCD 10 when vied in a planar perspective. The scintillator device 20 includes a scintillator 21 and a protective film 22. The scintillator 21 converts an energy beam which is a hard X-ray into scintillation light with an energy band to which the imaging portion lie is sensitive, such as a visible light beam with a wavelength band of 550 nm. The scintillator 21 is shaped in a plate having two opposing faces, the back side 21a and the front side 21b. Each of the back and front sides 21a and 21b overlaps with the imaging faces 11f. The thickness of the scintillator 21 is on the order of 100 to 500 µm. The front side 21b and the side face of the scintillator 21 are coated by the protective film 22. The protective film 22 is an organic film made of poly-para-xylylene. The organic film has a thickness of 20 µm or less, and prevents the scintillator 21 from being exposed to the air and also prevents deterioration in the light emission efficiency caused by the deliquescence of the scintillator 21.

The back side of the second CCD 30 is bonded by means of an optical adhesive to the front side of the scintillator device 20. The optical adhesive transmits at least the scintillation light emitted from the scintillator 21.

The second CCD 30 has substantially the same configuration as that of the first CCD 10 mentioned above. However, the second CCD 30 differs from the first CCD 10 in the following two points. First, the second CCD 30 differs from the first CCD 10 in that insulating layer 12c, insulating layer 12b, insulating layer 12a, p-type epitaxial layer 11c, p+-type semiconductor layer 11b and insulating layer 11a are stacked sequentially from the back side to the front side in the second CCD 30. In the second CCD 30, the back side of the imaging portion 11e is named as an imaging face 11f. In this case, the back side means the side near the transfer electrodes 12d. The insulating layer 12c of the second CCD 30 is bonded by an optical adhesive to the front side of the scintillator device 20, that is, to the protective film 22 of the scintillator device 20. The second CCD 30 also differs from the first CCD 10 in that the recess 11d is not formed in the p+-type semiconductor layer 11b of the second CCD 30. Since the recess 11d is not formed in the second CCD 30, the p+-type semiconductor layer 11b of the second CCD 30 is thicker in the stacking direction than the p+-type semiconductor layer 11b of the first CCD 10. Consequently, soft X-rays incident on the imaging device 1a from the front side of the second CCD 30 are absorbed by the p+-type semiconductor layer 11b and the p-type epitaxial layer 11c of the second CCD 30, so that the sensitivity with respect to soft X-rays coming in this way is low.

Thus, the first CCD 10, scintillator device 20, and second CCD 30 are sequentially stacked from the back side toward the front side so that the imaging portions 11e (and the imaging faces 11f) of the first CCD 10 and the second CCD 30 overlap with each other when viewed in a planar perspective with the scintillator 21 being interposed between the imaging portions 11e. As a result, an image of the scintillation light generated in the scintillator 21 and directed to the back side is taken by the imaging portion 11e of the first CCD 10, and an image of the scintillation light generated in the scintillator 21 and directed to the front side is taken by the imaging portion 11e of the second CCD 30.

Figure 3:
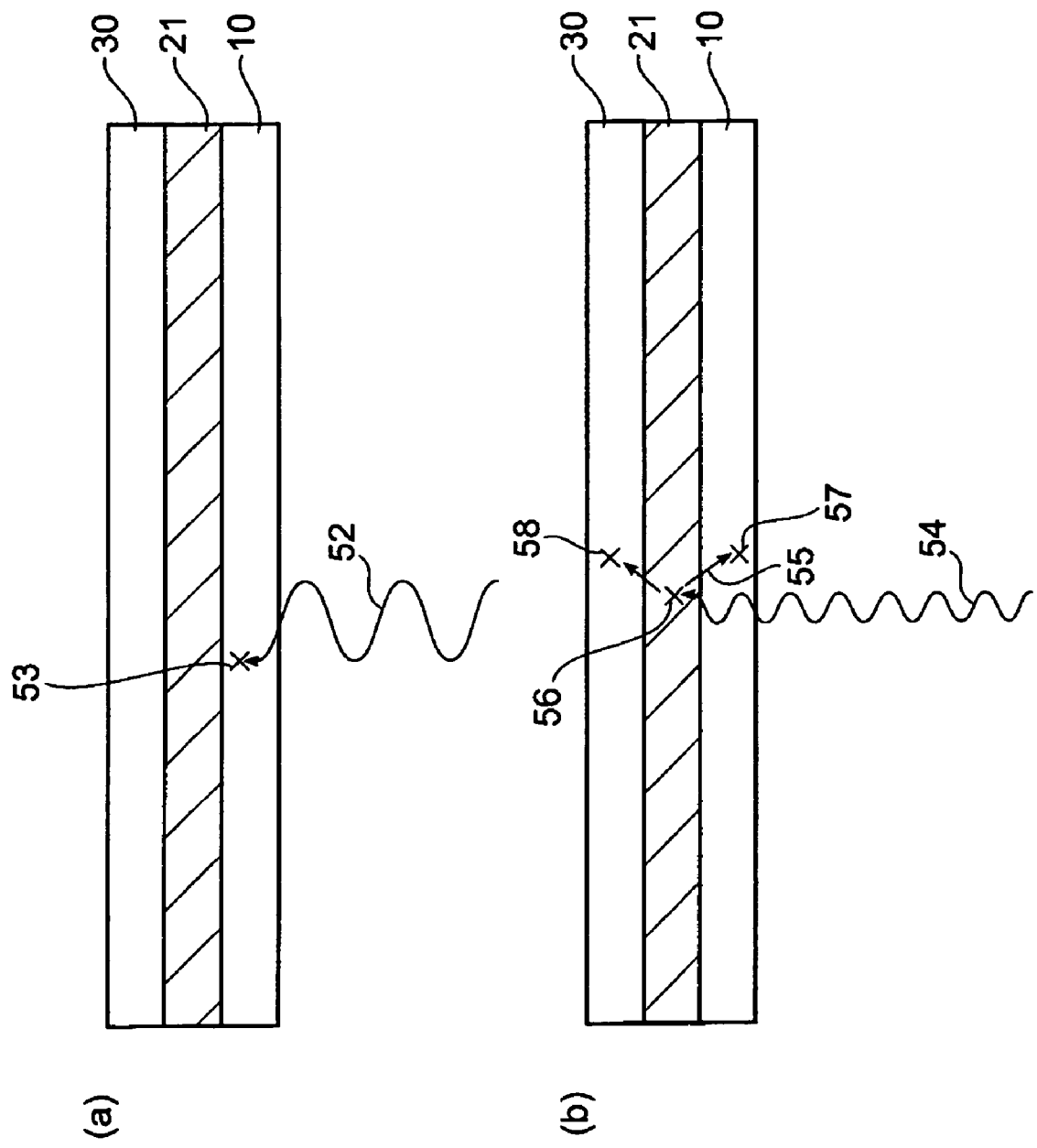
FIG. 3 is a view illustrating how the imaging is performed in the imaging device according to the embodiment.

The operation of an imaging device 1a will now be described with reference to FIG. 3. First, the operation of an imaging device 1a will be described with reference to FIG. 3(a). The imaging portion 11e of the p-type epitaxial layer 11c in the first CCD 10 is highly sensitive to soft X-rays. Therefore, when a soft X-ray 52 enters the imaging device 1a from the back side of the first CCD 10, the soft X-ray 52 is subjected to photoelectric conversion by the imaging portion 11e of the depleted p-type epitaxial layer 11c. Then charge in an amount corresponding to (proportional to) the energy of the incident soft X-ray 52 is generated at a position 53 by the imaging portion 11e. The charge generated by this photoelectric conversion is accumulated in each of the potential wells formed in the imaging portion 11e.

Referring to FIG. 3(b), the imaging portion 11e of the p-type epitaxial layer 11c in the first CCD 10 has a low sensitivity to hard X-rays. Therefore, when a hard X-ray 54 enters the imaging device 1a from the back side of the first CCD 10, the hard X-ray 54 passes through the first CCD 10 and comes to the scintillator 21. When the hard X-ray 54 enters the scintillator 21, scintillation light 55 is generated at a position 56 in the scintillator 21 and radiated in all directions. Some of the scintillation light 55 travels toward the first CCD 10 and enters the imaging portion 11e of the first CCD 10. Then, charge corresponding to the energy of the scintillation light 55 is generated at a position 57 by the imaging portion 11e of the first CCD 10. Another some of the scintillation light 55 travels toward the second CCD 30 and enters the imaging portion 11e of the second CCD 30. Then, charge corresponding to the energy of the scintillation light 55 is generated at a position 58 by the imaging portion 11e of the second CCD 30. Accordingly, an image of scintillation light generated in the scintillator 21 and directed toward the back side is taken by the imaging portion 11e of the first CCD 10, and an image of scintillation light generated in the scintillator 21 and directed to the front side is taken by the imaging portion 11e of the second CCD 30. Therefore, an image of almost all the scintillation light generated in the scintillator 21 and radiated in all directions is taken by either the first CCD 10 or the second CCD 30.

<Imaging System>

Figure 4:
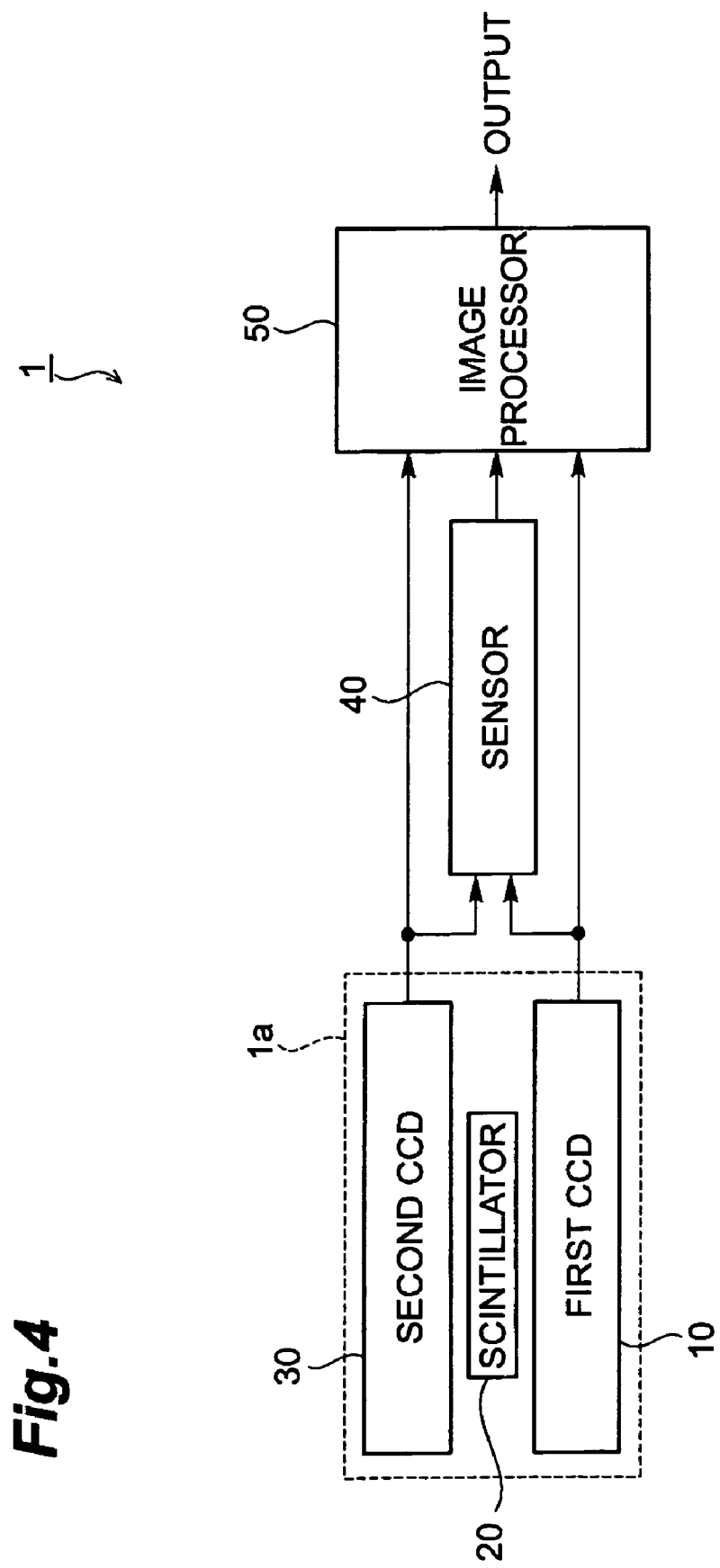
FIG. 4 is a block diagram showing the configuration of the imaging system according to the embodiment.

Referring to FIG. 4, an imaging system 1 for taking images of hard X-rays and soft X-rays using the above imaging device 1a will now be described.

The imaging system 1 includes the above imaging device 1a, a sensor 40, and an image processor 50. The imaging system 1 further includes a driver circuit (not shown) for driving the imaging device 1a. The imaging device 1a has the first CCD 10 and the second CCD 30, as mentioned above. The output image signals from the first and second CCDs 10 and 30 are both supplied to the sensor 40 and the image processor 50.

When detecting that the first CCD 10 and second CCD 30 have generated the output image signals at the same timing (in this embodiment, these image signals have levels not less than a predetermined signal level. The same is true in the following), the sensor 40 generates a detected signal indicating this fact and sends the detected signal to the image processor 50.

The output image signals generated at the same timing by the first CCD 10 and second CCD 30 both represent the images of scintillation light generated in the scintillator device 20 in response to incidence of hard X-rays. On the other hand, output image signals emitted from only the first CCD 10 represent images of soft X-rays. That is, the sensor 40 is one for detecting that the first CCD 10 and second CCD 30 have taken the images of scintillation light at the same timing.

In response to the detected signal from the sensor 40, the image processor 50 performs image processing for the output image signals from the first CCD 10 and second CCD 30 to generate an output image signal. That is, when the first CCD 10 and second CCD 30 generates output image signals at the same timing (in other words, when the detected signal is sent to the image processor 50 from the sensor 40), the image processor 50 combines the two image signals into an output image signal. On the other hand, when the first CCD 10 alone generates an output image signal (in other words, when the detected signal is not sent to the image processor 50 from the sensor 40), the image processor 50 emits only the image signal from the first CCD 10.

As described above, the imaging device 1a of this embodiment is positioned so that the imaging portions 11e of the first and second CCDs 10 and 30 oppose to each other with the scintillator 21 being interposed between these imaging portions 11e, and the scintillator 21 is positioned so as to overlap with the imaging portions 11e (and the imaging faces 11f) when viewed in a planar perspective. Accordingly, an image of scintillation light generated in the scintillator 21 and directed toward the back side is taken by the first CCD 10 and an image of scintillation light generated in the scintillator 21 and directed toward the front side is taken by the second CCD 30. As a result, an image of almost all the scintillation light generated in the scintillator 21 can be directly taken by the first CCD 10 and second CCD 30 without reflection of the scintillation light by a metal film for collecting the light, which can decrease the resolution. Thus, it is possible to perform imaging of scintillation light without decreasing the resolution.

In the first CCD 10, a region of the semiconductor substrate 11 is thinned because of the recess 11d, which region is covered by the imaging portion 11e and extends in the thickness direction. Accordingly, images of soft X-rays can be directly taken by the imaging portion 11e without reflecting the soft X-rays. As a result, images of soft X-rays can be taken using only the first CCD 10 without decreasing the resolution. That is, according to the imaging device 1a of this embodiment, imaging of X-rays that belongs to a wide energy band of 0.1 to 100 keV ranging from soft X-rays to hard X-rays is possible without decreasing the resolution.

Furthermore, since a column-like crystal of CsI is used for the scintillator device 20, it is possible to determine the position of the light emission at a high accuracy, and also obtain a high energy resolution due to a large amount of light emission from the scintillator device 20.

In addition, according to the imaging system 1 of this embodiment, the sensor 40 detects that image signals (i.e., image signals of hard X-rays) have been emitted at the same timing from the first CCD 10 and second CCD 30, that is, that images of scintillation light have been taken by the first and second CCDs 10 and 30 at the same timing, and sends the detected signal to the image processor 50. According to the result of the detection by the sensor 40, the image processor 50 performs image processing for image signals. If two image signals of a hard X-ray are generated, the image processor 50 combines these two image signals into an output image signal. On the other hand, if an image signal is emitted from only the first CCD 10, that is, if an image signal of a soft X ray is generated, the image processor 50 emits only this image signal.

<Modifications>

The present invention is not limited to the embodiment mentioned above, and a variety of modifications are available. For example, in the above embodiment, the scintillator 21 is directly attached to the insulating layer 12c of the first CCD 10 by an optical adhesive. However, the present invention is not limited to such an arrangement. The scintillator 21 may also be directly attached to the insulating layer 12c of the second CCD 30 by an optical adhesive.

Both the first CCD 10 and the scintillator device 20 are FFT-type CCDs in the above embodiment, but are not limited thereto. Other transfer-type CCDs such as inter-line type CCDs are also available.

The semiconductor substrate 11 is a p-type substrate in the imaging system 1; however, the semiconductor substrate 11 is not limited thereto and may be an n-type substrate. In this case, the impurity concentration of the n-type semiconductor can be reduced, and therefore the depletion layer can be made thicker than that provided in case where a p-type semiconductor is used. Consequently, it is no longer necessary to partially reduce the thickenss of the semiconductor substrate 11 by forming the recess 11d, and the step of forming the recess 11d is not required.

In the imaging system 1, a scintillator 21 containing $Bi_4Ge_3O_{12}$ (called 'BGO' hereinbelow) may be used. In this case, although the scintillator 21 may contain other substances, the scintillator 21 preferebly contains BGO at 95-100 mass %. The BGO forms a column-like crystal similarly to CsI, and therefore the incident position of an X-ray in the scintillator 21 can be determined highly accurately. Also, since the amount of light emission of the scintillator 21 containing BGO is large, a high energy resolution can be obtained. Imaging devices are often used while being cooled in order to suppress thermal noise. However, the BGO still has a large amount of light emission even when being cooled to about minus 100° C. Hence, even when the imaging system 1 is used while being cooled, a high energy resolution can be obtained by using the scintillator 21 containing BGO.

In the imaging system 1, a scintillator 21 containing $Gd_2O_2S$ may be used. Since $Gd_2O_2S$ forms a column-like crystal similarly to CsI, the incident position of an X-ray in the scintillator 21 can be determined highly accurately. In addition, since the amount of light emission of the scintillator 21 containing the $Gd_2O_2S$ is large, a high energy resolution can be obtained.

Figure 5:
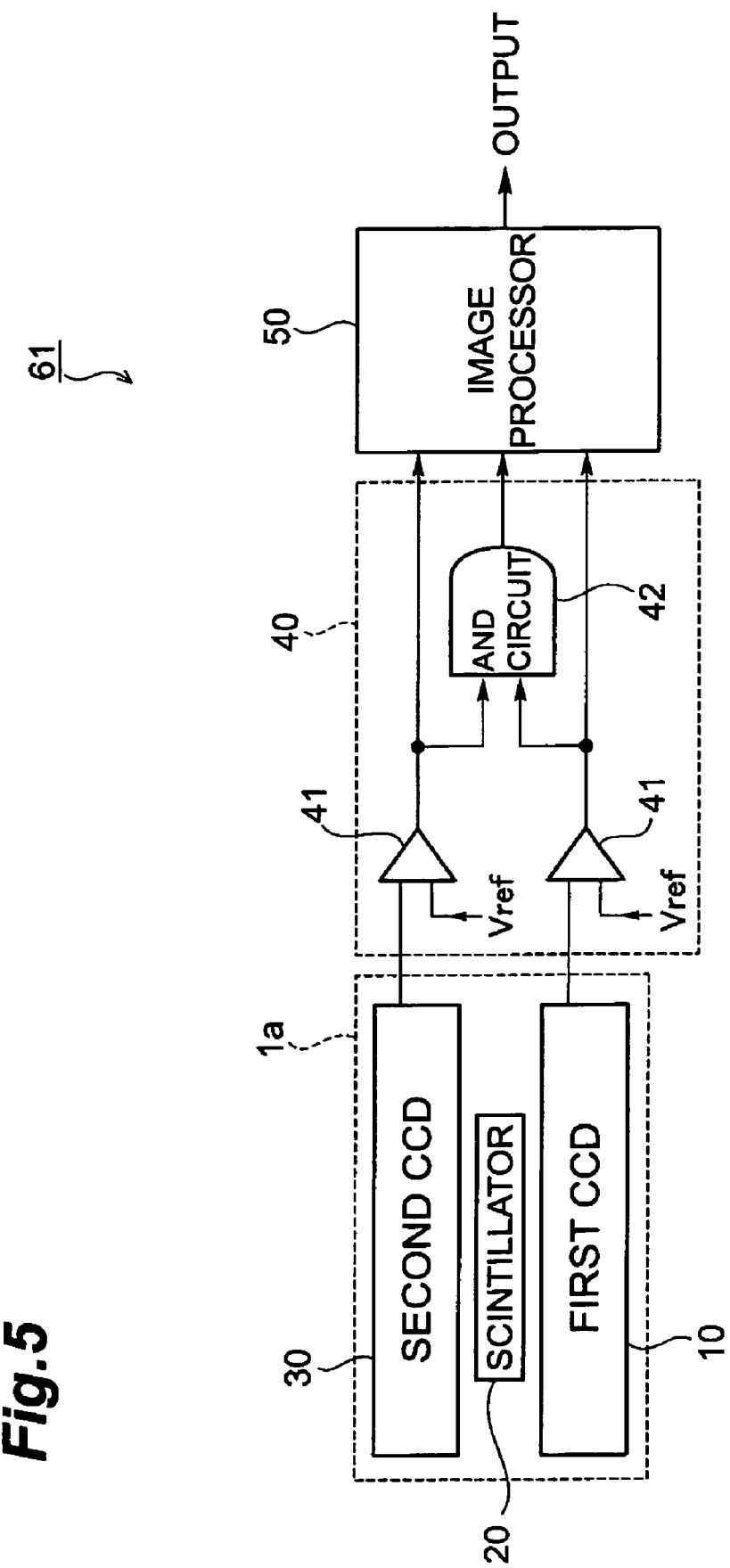
FIG. 5 is a block diagram showing the configuration of another imaging system.

The imaging system of the present invention may be an imaging system 61 as shown in FIG. 5. The imaging system 61 includes the sensor 40 and the image processor 50, and the sensor 40 includes two signal level discriminator circuits 41 and an AND circuit 42. The first CCD 10 and the second CCD 30 of the imaging device 1a shown in FIG. 5 operate in response to the same read signal (this operation is called synchronized driving).

The output image signals from the first CCD 10 and second CCD 30 are sent to the respective signal level discriminator circuits 41. Each of the signal level discriminator circuits 41 determines whether the signal level of the image signal is not less than a predetermined reference level Vref When determining the image signal has a level not less than Vref, each of the discriminator circuit 41 sends this image signal to both the AND circuit 42 and the image processor 50.

The AND circuit 42 detects that image signals each having a level not less than the reference level Vref are emitted at the same timing from the first CCD 10 and second CCD 30. The AND circuit 42 then generates and sends a detected signal indicating this fact to the image processor 50.

The image signals emitted at the same timing from the first CCD 10 and second CCD 30 both represent images of scintillation light generated in the scintillator device 20 in response to incidence of hard X-rays. On the other hand, image signals emitted from only the first CCD 10 represent images of soft X-rays. That is, the AND circuit 42 detects that the first CCD 10 and second CCD 30 have taken the images of scintillation light at the same timing.

The image processor 50 perfoms image processing for the image signals from the first CCD 10 and second CCD 30 according to the result of the detection by the AND circuit 42. That is, when image signals having levels not less than the reference level Vref are emitted at the same timing from the first CCD 10 and second CCD 30 (in other words, when the detected signal is sent to the image processor 50 from the AND circuit 42), the image processor 50 combines the two image signals into an output image signal. On the other hand, when an image signal having a level not less than Vref is emitted from the first CCD 10 alone (in other words, when the detected signal is not sent to the image processor 50 from the AND circuit 42), the image processor 50 emits only this image signal.

Thus, even when the first CCD 10 and second CCD 30 are driven in synchronization and therefore the CCDs always perform imaging at the same timing, the two image signals having levels not less than the reference level Vref are combined and outputted by image processor 50. As a result, image signals lower than the reference level Vref can be processed as noises, thereby enabling image signals with high quality to be provided.

Figure 6:
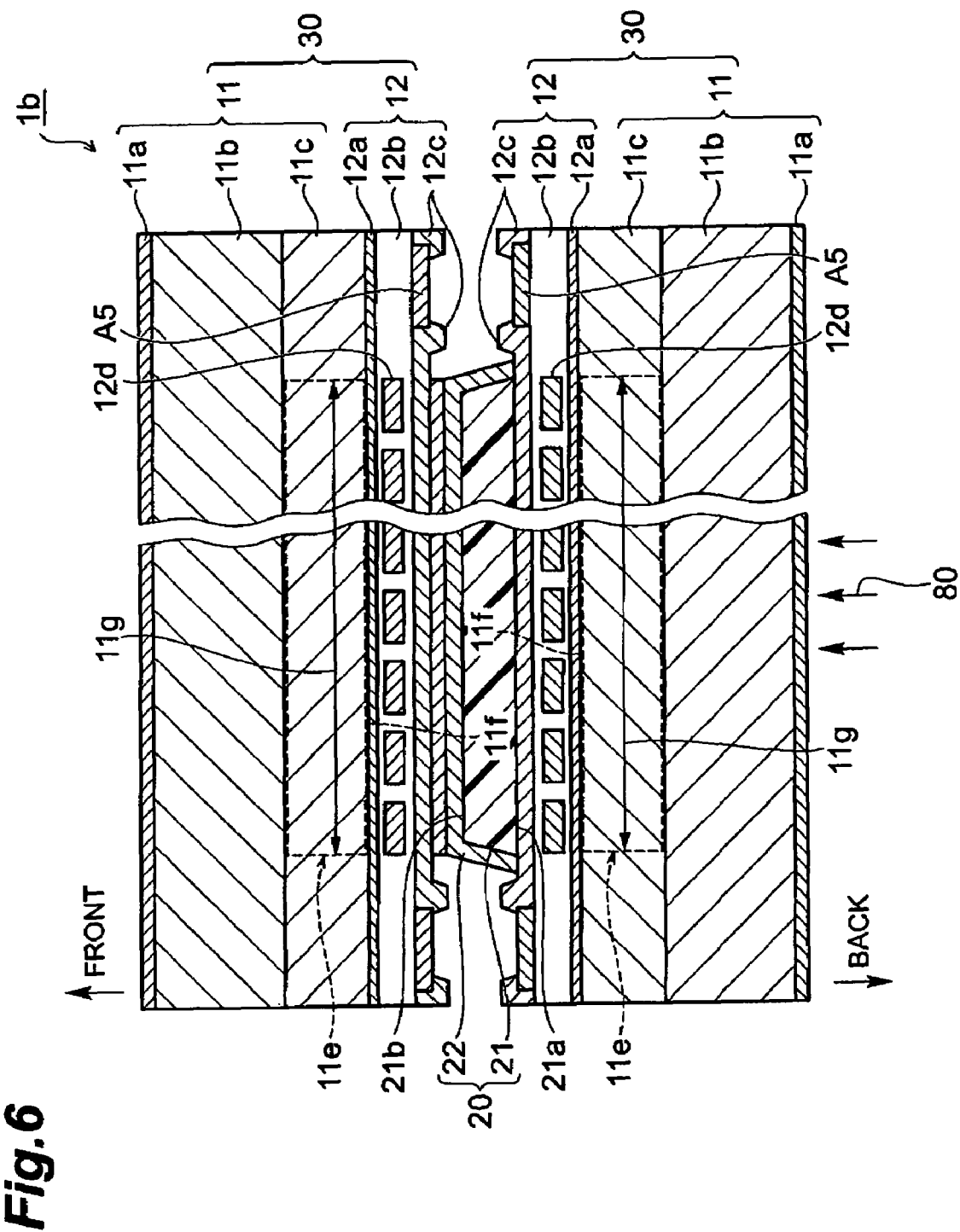
FIG. 6 is a cross sectional view showing the configuration of another imaging device.
Figure 7:
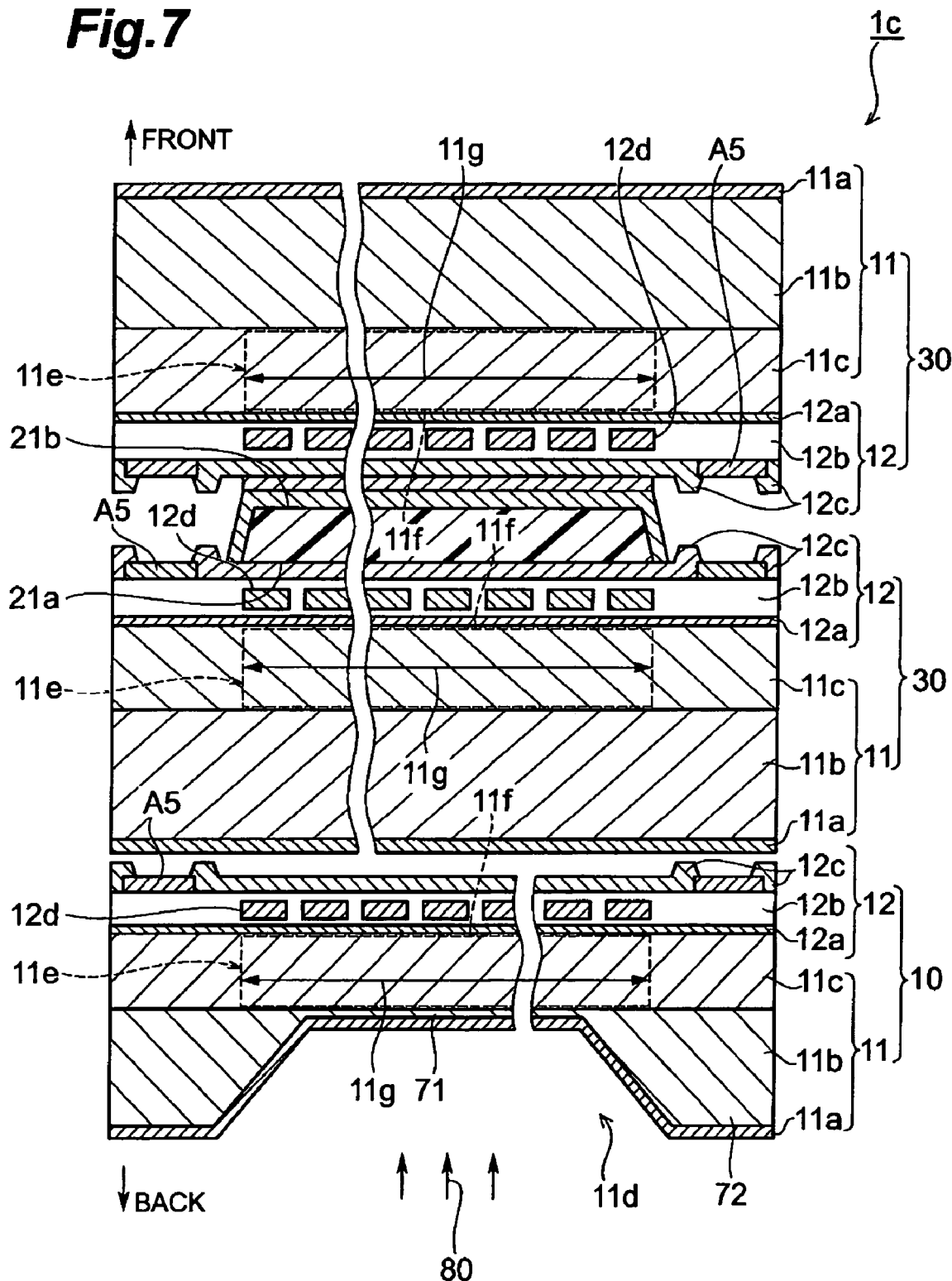
FIG. 7 is a cross sectional view showing still another imaging device.

The imaging device according to the present invention is not limited to the imaging device 1a mentioned above, and may instead be an imaging device shown in FIG. 6 or FIG. 7. The imaging device 1b shown in FIG. 6 does not have the recess 1d, which is formed in the first CCD 10 of the imaging device 1a shown in FIG. 1. In other words, the imaging device 1b employs the second CCD 30 in place of the first CCD 10. That is, the imaging device 1b has two second CCDs 30. The two second CCDs 30 have their respective imaging portions 1e that oppose to each other with the scintillator device 20 being interposed therebetween, and the imaging portions 11e (and the imaging faces 11f) overlap with each other when viewed in a planar perspective.

If the incident energy beam 80 is a soft X-ray, it is difficult for the imaging device 1b to take an image of the energy beam 80 because the energy of the soft X-ray is absorbed before arriving at the imaging portions 11e. However, if the energy beam 80 is a hard X-ray, it is possible to take an image of the energy beam 80 using scintillation light with high accuracy, as in the imaging device 1a mentioned above. That is, an image of almost all the scintillation light emitted from the scintillator 21 can be directly taken by the first CCD 10 and second CCD 30 without reflecting the scintillation light and without using a metal film for collecting the light, which can decreases the resolution. Thus, it is possible to take images of the scintillation light resulting from incidence of hard X-rays on the scintillator 21, without decreasing the resolution.

The imaging device 1c shown in FIG. 7 has a structure in which the first CCD 10 is additionally provided on the back side of the imaging device 1b shown in FIG. 6. As in the imaging device 1b shown in FIG. 6, when the incident energy beam 80 is a hard X-ray, the imaging device 1c is capable of taking an image of the energy beam 80 at a high resolution using scintillation light In addition, the imaging device 1c is capable of taking images of soft X-rays using the first CCD 10 disposed on the back side. Therefore, even when the energy beam 80 is a soft X-ray, it is possible to take an image of the energy beam 80 at a high resolution.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An imaging device, comprising:
 a scintillator for emitting scintillation light in response to an incidence of an energy beam; and
 first and second imaging elements for taking an image of the scintillation light, the first imaging element being situated at a side of the imaging device where the energy beam enters and having a first imaging face, the second imaging element having a second imaging face opposing to the first imaging face,
 the scintillator being disposed between the first and second imaging faces so that the scintillator overlaps with the first and second imaging faces,
 wherein a recess portion provided in the first imaging element results in a portion of the first imaging element being thinner than the second imaging element in a stacking direction of the first and second imaging elements.

2. The imaging device according to claim 1, wherein the scintillator is shaped in a plate having two opposing faces, one of the opposing faces overlapping with the first imaging face, and the other overlapping with the second imaging face.

3. The imaging device according to claim 1, wherein the first imaging element has a first region covered by the first imaging face and a second region adjacent to the first region, and the first region is thinner than the second region.

4. The imaging device according to claim 1, wherein the second imaging element has a third region covered by the second imaging face and a fourth region adjacent to the third region, and the third region is thinner than the fourth region.

5. The imaging device according to claim 1, further comprising a third imaging element for taking an image of an energy beam incident thereon, the third imaging element having a third imaging face that overlaps with the first and second imaging faces.

6. The imaging device according to claim 5, wherein the third imaging element has a fifth region covered by the third imaging face and a sixth region adjacent to the fifth region, and the fifth region is thinner than the sixth region.

7. The imaging device according to claim 1, wherein the scintillator contains one or more of CsI, $Bi_4Ge_3O_{12}$ and $Gd_2O_2S$.

8. An imaging system, comprising:
 an imaging device according to claim 1;
 a sensor for detecting that the first and second imaging elements in the imaging device have taken images of the scintillation light at the same timing; and
 an image processor for combining the images taken by the first and second imaging elements into an output image signal when the sensor detects that the first and second imaging elements have taken images of the scintillation light at the same timing.

9. The imaging system according to claim 8, wherein the sensor detects that the first and second imaging elements emit image signals at the same timing, each image signal having a level not less than a predetermined reference level.

10. The imaging system according to claim 8, wherein when the first imaging element alone generates an output image signal, the image processor emits only an image signal from the first imaging element.

11. The imaging device according to claim 1, wherein the first imaging element is configured so that an incident soft X-ray is photoelectrically converted within the first imaging element into a charge proportional to the energy of the incident soft X-ray.

* * * * *